United States Patent
Yu (10) Patent No.: US 8,667,837 B2
(45) Date of Patent: Mar. 11, 2014

(54) WIRELESS TIRE PRESSURE SENSING DEVICE, METHOD FOR SETTING A STANDARD TIRE PRESSURE THEREOF, AND WIRELESS TIRE PRESSURE SENSING ACTIVATION DEVICE

(75) Inventor: Hung-Chih Yu, Taichung (TW)

(73) Assignee: Orange Electronics Co., Ltd., Taichung (TW)

( * ) Notice: Subject to any disclaimer, the term of this patent is extended or adjusted under 35 U.S.C. 154(b) by 449 days.

(21) Appl. No.: 13/109,173

(22) Filed: May 17, 2011

(65) Prior Publication Data

US 2012/0152008 A1 Jun. 21, 2012

(30) Foreign Application Priority Data

Dec. 17, 2010 (TW) ................................. 99144361 A (51) Int. Cl.
*B60C 23/02* (2006.01)
(52) U.S. Cl.
USPC ........................................ 73/146.5; 340/442
(58) Field of Classification Search
None
See application file for complete search history.

(56) References Cited

U.S. PATENT DOCUMENTS

| | | | | |
|---|---|---|---|---|
| 6,609,419 B1 * | 8/2003 | Bankart et al. | ............... | 73/146.5 |
| 6,894,600 B2 * | 5/2005 | Phelan | ........... | 340/10.34 |
| 7,076,386 B2 * | 7/2006 | Forti | ............... | 702/98 |
| 7,132,939 B2 * | 11/2006 | Tyndall et al. | ........... | 340/447 |
| 7,161,476 B2 * | 1/2007 | Hardman et al. | ........... | 340/442 |
| 7,856,871 B2 * | 12/2010 | Mancosu et al. | ........... | 73/146.5 |
| 8,316,700 B2 * | 11/2012 | Brusarosco et al. | ........... | 73/146 |
| 2010/0156618 A1 * | 6/2010 | Huang | ........... | 340/442 |

* cited by examiner

*Primary Examiner* — Lisa Caputo
*Assistant Examiner* — Jermaine Jenkins
(74) *Attorney, Agent, or Firm* — patenttm.us (57) ABSTRACT

A wireless tire pressure sensing device, a method for setting a standard tire pressure thereof and a wireless tire pressure sensing activation device adjust the tire pressure of each tire in a vehicle to a standard tire pressure according to a requirement of the vehicle after the wireless tire pressure sensing device is mounted in each tire, maintain each tire at the standard tire pressure for a preset time period or employ the wireless tire pressure sensing activation device to transmit a setup instruction to the wireless tire pressure sensing device to set a current tire pressure as the standard tire pressure. The wireless tire pressure sensing device can be set up with the standard tire pressure and conveniently modified. As no threshold value of tire pressure needs to be pre-stored, wireless tire pressure sensing devices with different threshold values are not necessarily prepared beforehand, thereby effectively lowering the stocking pressure on inventory management.

29 Claims, 9 Drawing Sheets

WIRELESS TIRE PRESSURE SENSING DEVICE, METHOD FOR SETTING A STANDARD TIRE PRESSURE THEREOF, AND WIRELESS TIRE PRESSURE SENSING ACTIVATION DEVICE

BACKGROUND OF THE INVENTION

1. Field of the Invention

The present invention relates to a tire pressure sensing device and a tire pressure sensing method, and more particularly to a wireless tire pressure sensing device and a wireless tire pressure sensing method to facilitate setting and modifying a standard tire pressure of the wireless tire pressure sensing device after the wireless tire pressure sensing device is mounted in a tire.

2. Description of the Related Art

Figure 7:
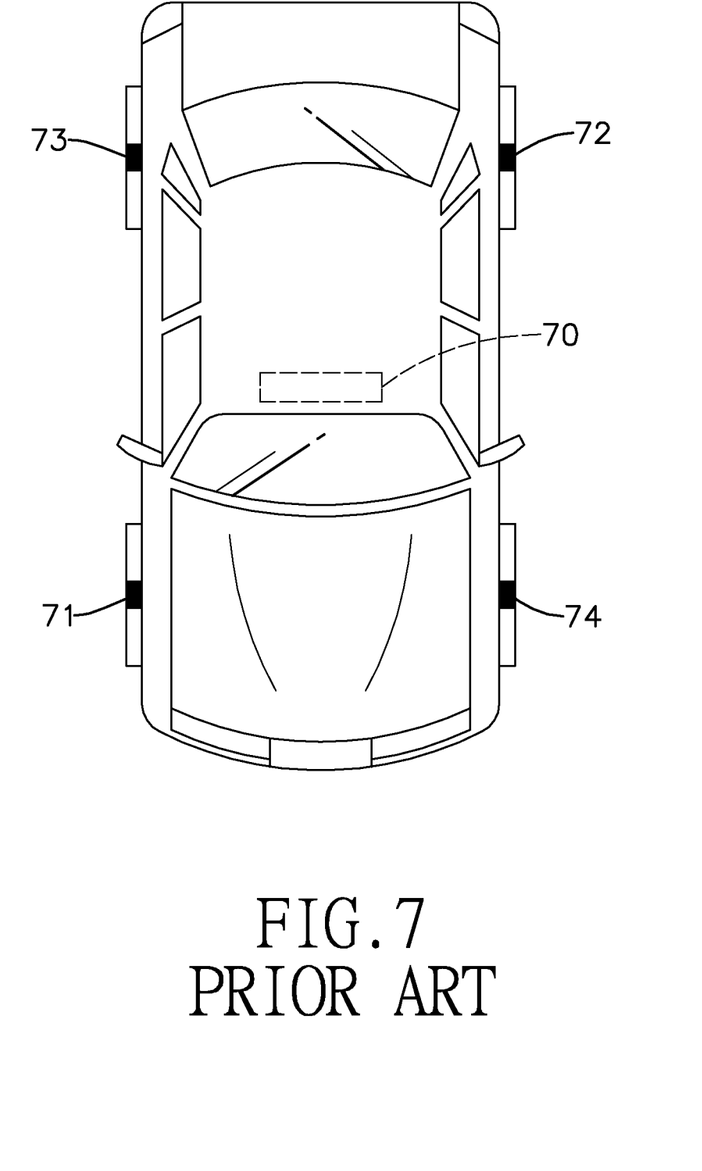
FIG. 7 is a schematic view of a conventional wireless sensing system mounted in a vehicle.

With reference to FIG. 7, a conventional wireless tire pressure monitoring system (WTPMS) has multiple wireless tire pressure sensors 71~74 and a monitoring unit 70. The wireless tire pressure sensors 71~74 are respectively mounted in tires of a vehicle. The monitoring unit 70 is mounted inside the vehicle. Each wireless tire pressure sensor 71~74 has a battery, a sensing element, a control unit with embedded or external memory, a high-frequency transmitting circuit and a low-frequency circuit. Each wireless tire pressure sensor 71~74 is configured with one set of dedicated code having at least 8 bits when shipped out of the factory.

When the WTPMS is activated, each wireless tire pressure sensor 71~74 regularly or irregularly transmits detected information and the dedicated codes to the monitoring unit 70 through the high-frequency transmitting circuit by means of a fixed coding method. After receiving data, the monitoring unit 70 compares the received data with the dedicated codes to determine if the received data are transmitted from one of the wireless tire pressure sensors 71~74 of the vehicle or from other vehicles. After determining that the data are transmitted from one of the wireless tire pressure sensor 71~74 mounted in one of the tires of the vehicle, the monitoring unit 70 further decodes tire pressure, tire temperature and other detected relevant values of the tire.

Manufacturers normally store standard tire pressure, low pressure threshold, and other relevant threshold values in a memory of the monitoring unit 70 before delivering the WTPMS. Hence, after comparing the received tire pressure and other relevant values with the preset threshold values, the monitoring unit 70 determines if the tire is in an abnormal condition.

Although most WTPMSs store data such as standard tire pressure or threshold values in the memory of the monitoring unit 70, some wireless tire pressure sensors have relevant tire pressure pre-stored prior to delivery so that the wireless tire pressure sensors can intensively transmit data to inform the monitoring unit 70 of variation and irregularity of abnormal tires for alerting drivers ahead of time when the detected tire pressure or other detected values exceed the preset threshold values.

However, tire pressure has not been standardized yet for various vehicles on the road or for sales. Vehicles varying in model, weight or tire type may have different tire pressure values for their tires. For example, certain car owners prefer to replace original tires of their vehicles with high speed tires requiring much higher standard tire pressure than that of the original tires. If the threshold values remain the same, malfunction or misjudgment of the WTPMS easily arises. As a result, when the desired tire pressure is different from the preset tire pressure, service personnel of a service center or a tire store must manually adjust the threshold valves in the monitoring unit 70. As the threshold value calculation method varies from WTPMS to WTPMS and the procedure for adjusting the threshold values in the monitoring unit is complicated, the adjusting procedure is not easy to be correctly conducted.

To cope with the foregoing problems, the tire pressure sensor can be mounted in a tire and wirelessly transmits detected tire pressure values to a master control unit for drivers to understand current tire pressure condition. The master control unit computes an average tire pressure value of the two front wheels and the two rear wheels and stores the value therein as a pressure warning value upon detecting tire pressure of the front wheels and the rear wheels. It is unnecessary for such solution to set up the pressure warning values for different types of vehicle models prior to their delivery. The tire pressure sensors of the solution can be universally applied to any kind of vehicle model or tire.

However, the above solution only tackles the setup issue of the monitoring unit 70 while leaving the setup issue of the wireless tire pressure sensors unresolved.

Additionally, as certain wireless tire pressure sensors are pre-stored with threshold values or standard tire pressure therein and are mounted and sealed in tires prior to their shipment, the threshold values in the wireless tire pressure sensors cannot be adjusted after their delivery. Accordingly, manufacturers of the wireless tire pressure sensors need to produce various wireless tire pressure sensors having different threshold values to meet the need of different threshold values, and inevitably build up the stocking pressure on inventory management for the manufacturers.

SUMMARY OF THE INVENTION

A first objective of the present invention is to provide a wireless tire pressure sensing method to facilitate setting and modifying a standard tire pressure of a wireless tire pressure sensing device after the wireless tire pressure sensing device is mounted in a tire.

To achieve the foregoing objective, the method for setting a standard tire pressure of a wireless tire pressure sensing device is performed in a tire pressure setup mode and has steps of:

counting time until a time period ends;
detecting a current tire pressure; and
setting the current tire pressure as the standard tire pressure.

Preferably, the wireless tire pressure sensing device is adapted to be mounted in each tire of a vehicle, the tire pressure in each tire is adjusted to the standard tire pressure according to a requirement of the vehicle, the tire is maintained at the standard pressure for the time period, and after the time period is over, the wireless tire pressure sensing device detects the current tire pressure and automatically sets the current tire pressure as the standard tire pressure of the tire.

To achieve the foregoing objective, an alternative method for setting a standard tire pressure of a wireless tire pressure sensing device is performed in a tire pressure setup mode and has steps of:

determining if a setup instruction is received;
if positive, sensing a current tire pressure; and
setting the current tire pressure as a standard tire pressure.

Preferably, the wireless tire pressure sensing device is adapted to be mounted in each tire of a vehicle, the tire pressure of each tire is adjusted to the standard tire pressure according to a requirement of the vehicle, the setup instruction is externally transmitted to the wireless tire pressure sensing device, and the wireless tire pressure sensing device senses and sets the current tire pressure as the standard tire pressure after receiving the setup instruction.

Preferably, the wireless tire pressure sensing device further transmits out data having the standard tire pressure.

A second objective of the present invention is to provide a wireless tire pressure sensing device for easily setting a standard tire pressure thereof.

To achieve the foregoing objective, a wireless tire pressure sensing activation device has a micro-controller, a low-frequency transmitting circuit, a high-frequency receiving circuit and a power supply. The low-frequency transmitting circuit is connected to an output terminal of the micro-controller for transmitting a setup instruction to the wireless tire pressure sensing device. The high-frequency receiving circuit is connected to an input terminal of the micro-controller for receiving data having the standard tire pressure from the wireless tire pressure sensing device. The power supply supplies an operating power to the micro-controller, the low-frequency transmitting circuit and the high-frequency receiving circuit.

After a wireless tire pressure sensing device is mounted in a tire and activated, an operation personnel first inflates the tire to a desired tire pressure and employs the wireless tire pressure sensing activation device to transmit a setup instruction to the wireless tire pressure sensing device. The wireless tire pressure sensing device senses and sets up a current tire pressure as the standard tire pressure, and transmits out data having the standard tire pressure.

A third objective of the present invention is to provide a wireless tire pressure sensing device to facilitate entering a setup mode by means of external activation.

To achieve the foregoing objective, a wireless tire pressure sensing device has a micro-controller, at least one sensing chip, a high-frequency transmitting circuit, a sensing element and a power supply. The at least one sensing chip is respectively connected to at least one input terminal of the micro-controller, and detects tire pressure and temperature inside a tire. The high-frequency transmitting circuit is connected to an output terminal of the micro-controller. The sensing element is respectively connected to an input terminal of the micro-controller for receiving a setup instruction. The power supply supplies an operating power to the micro-controller, the at least one sensing chip, the high-frequency transmitting circuit and the sensing element.

The above wireless tire pressure sensing device can be externally activated to set up the standard tire pressure. After a driving element externally approaches and is continuously sensed by the sensing element for a period of time, the wireless tire pressure sensing device starts sensing and setting up a standard tire pressure.

Based on the foregoing features, the present invention has the following advantages.

1. Manufacturers do not need to stock wireless tire pressure sensing devices having various standard tire pressures or threshold values so as not to build up the stocking pressure on inventory management.

2. The standard tire pressure or threshold value can be easily customized and modified by the foregoing method based on customer's demand.

Other objectives, advantages and novel features of the invention will become more apparent from the following detailed description when taken in conjunction with the accompanying drawings.

DETAILED DESCRIPTION OF THE INVENTION

Figure 1A:
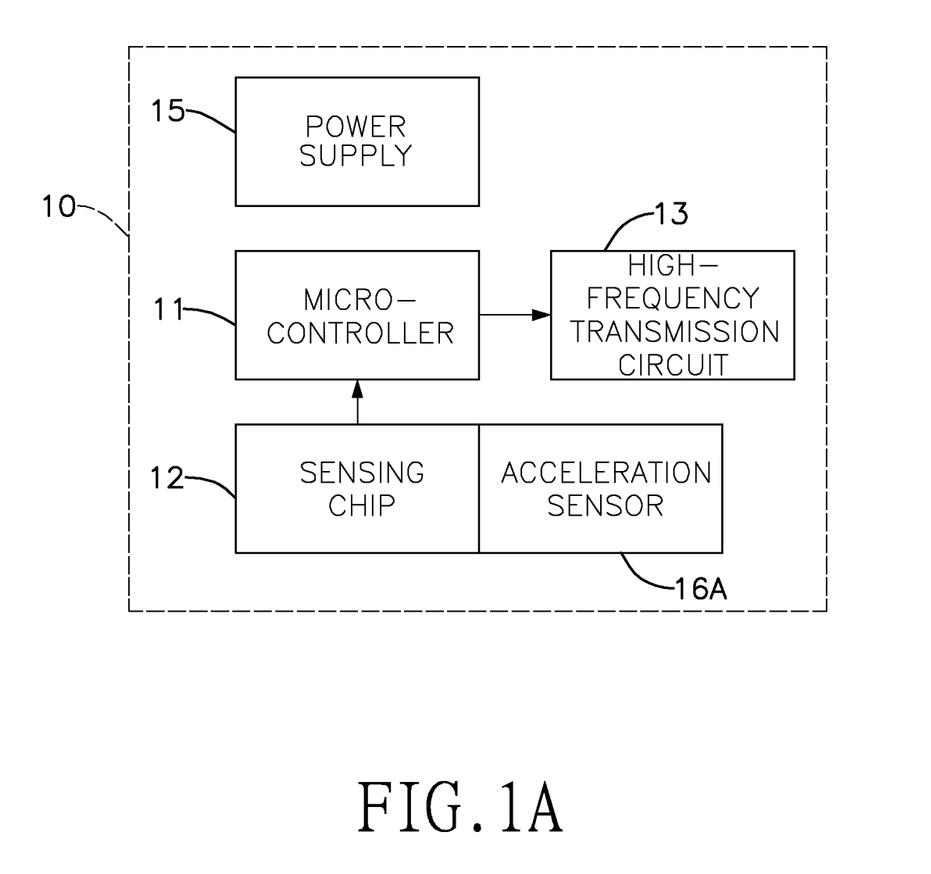
FIG. 1A is a functional block diagram of a first embodiment of a wireless tire pressure sensing device in accordance with the present invention.
Figure 1B:
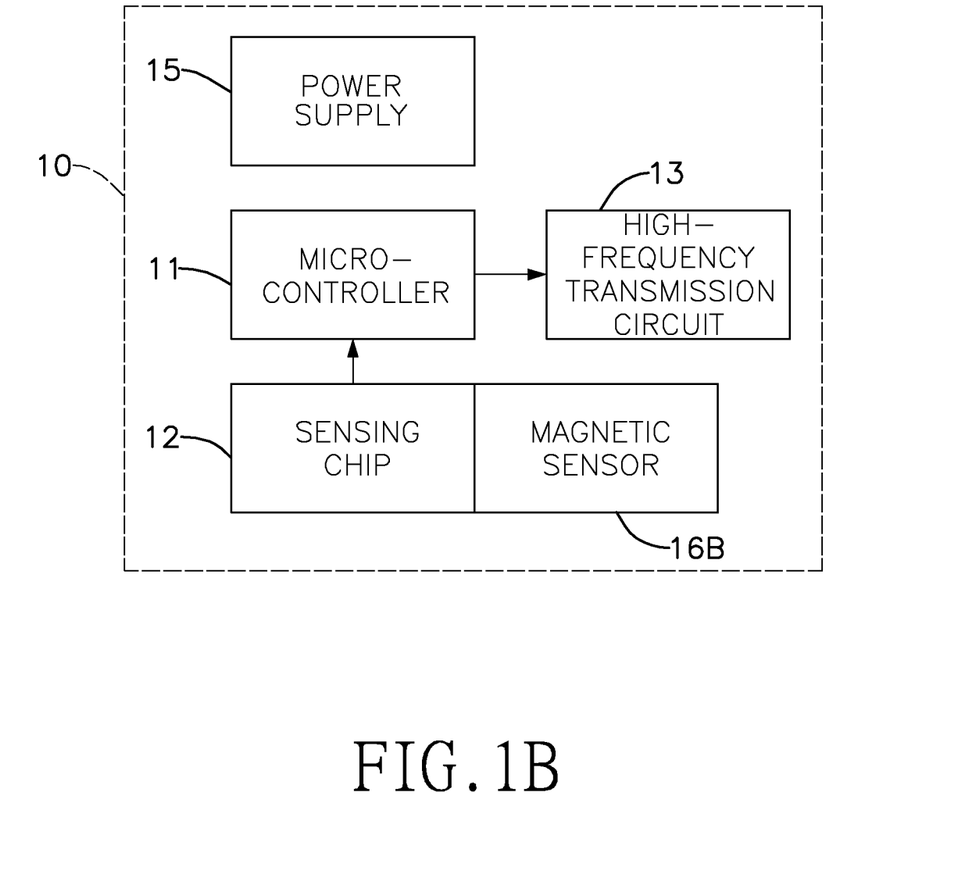
FIG. 1B is a functional block diagram of a second embodiment of a wireless tire pressure sensing device in accordance with the present invention.

With reference to FIGS. 1A and 1B, a wireless tire pressure sensing device 10 in accordance with the present invention has a micro-controller 11, at least one sensing chip 12, a high-frequency transmission circuit 13 and a power supply 15. The at least one sensing chip 12 is respectively connected to at least one input terminal of the micro-controller 11, and detects tire pressure and other relevant sensed values, such as tire temperature and the like. The high-frequency transmission circuit 13 is connected to an output terminal of the micro-controller 11, and transmits the sensed values of tire pressure and others to a monitoring unit. The power supply 15 supplies an operating power to the foregoing components. The high frequencies used by the wireless tire pressure sensing device 10 may be 315 MHz, 433 MHz, 447 MHz and other open frequencies designated by local governments. The low frequencies used by the wireless tire pressure sensing device 10 are lower frequencies relative to the high frequencies, and may be 125 kHz, 13.56 MHz or other open frequencies designated by local governments. The sensing chip 12 may be further integrated with other sensing function or sensing element, such as an acceleration sensor 16A as shown in FIG. 1A or a magnetic sensor 16B as shown in FIG. 1B, to detect the sensed values other than tire pressure and tire temperature.

Figure 2:
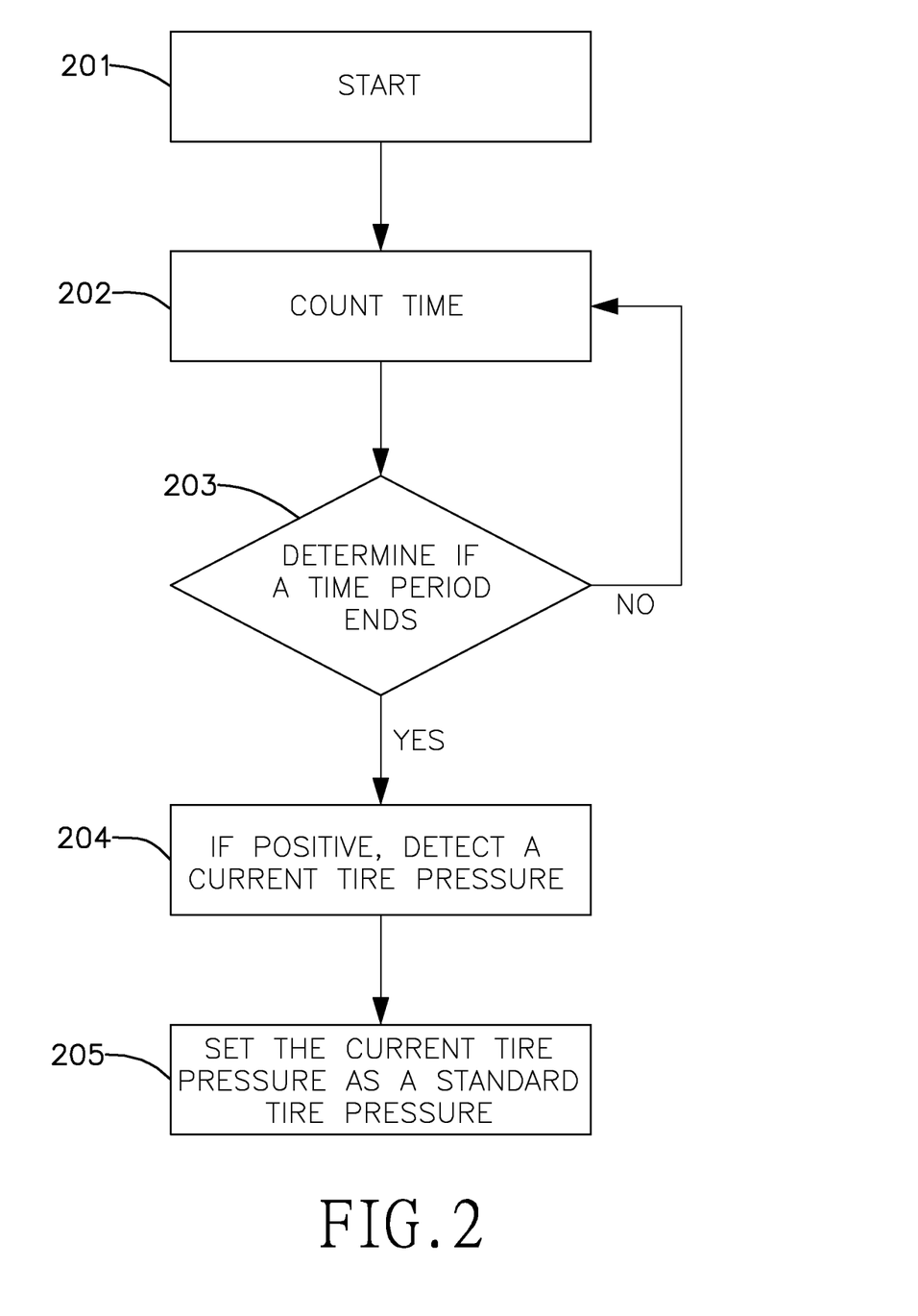
FIG. 2 is a flow chart of a first embodiment of a method for setting a standard tire pressure in accordance with the present invention.

With reference to FIG. 2, a first embodiment of a method for setting a standard tire pressure of a wireless tire pressure sensing device in accordance with the present invention enables the micro-controller 11 to perform the following steps of:

starting 201;
counting time 202;
determining if a time period ends 203;
if positive, detecting a current tire pressure 204; and setting the current tire pressure as a standard tire pressure 205.

Instead of before delivery, the method for setting a standard tire pressure can be carried out after delivering the wireless tire pressure sensing device 10 in accordance with the characteristics and actual requirements of each tire. The method can be substantially implemented as follows.

The wireless tire pressure sensor preset with none of any standard tire pressure is mounted in each tire of a vehicle. If the wireless tire pressure sensing device 10 is deactivated, the wireless tire pressure sensing device 10 is activated to enter a setup mode. In accordance with the actual demand of a vehicle, the tire pressure is adjusted to a standard value and the tire pressure is maintained at the standard value for the pre-defined time period. The pre-defined time period is a time period within which the tire pressure should be stable, and may be 30 minutes or longer or shorter in duration. After the micro-controller determines that the pre-defined time period ends, the sensing chip 12 senses a current tire pressure, and automatically sets the tire pressure as the standard tire pressure. Given the above procedure, the standard tire pressure of the wireless tire pressure sensing device 10 can be easily set up.

Figure 3:
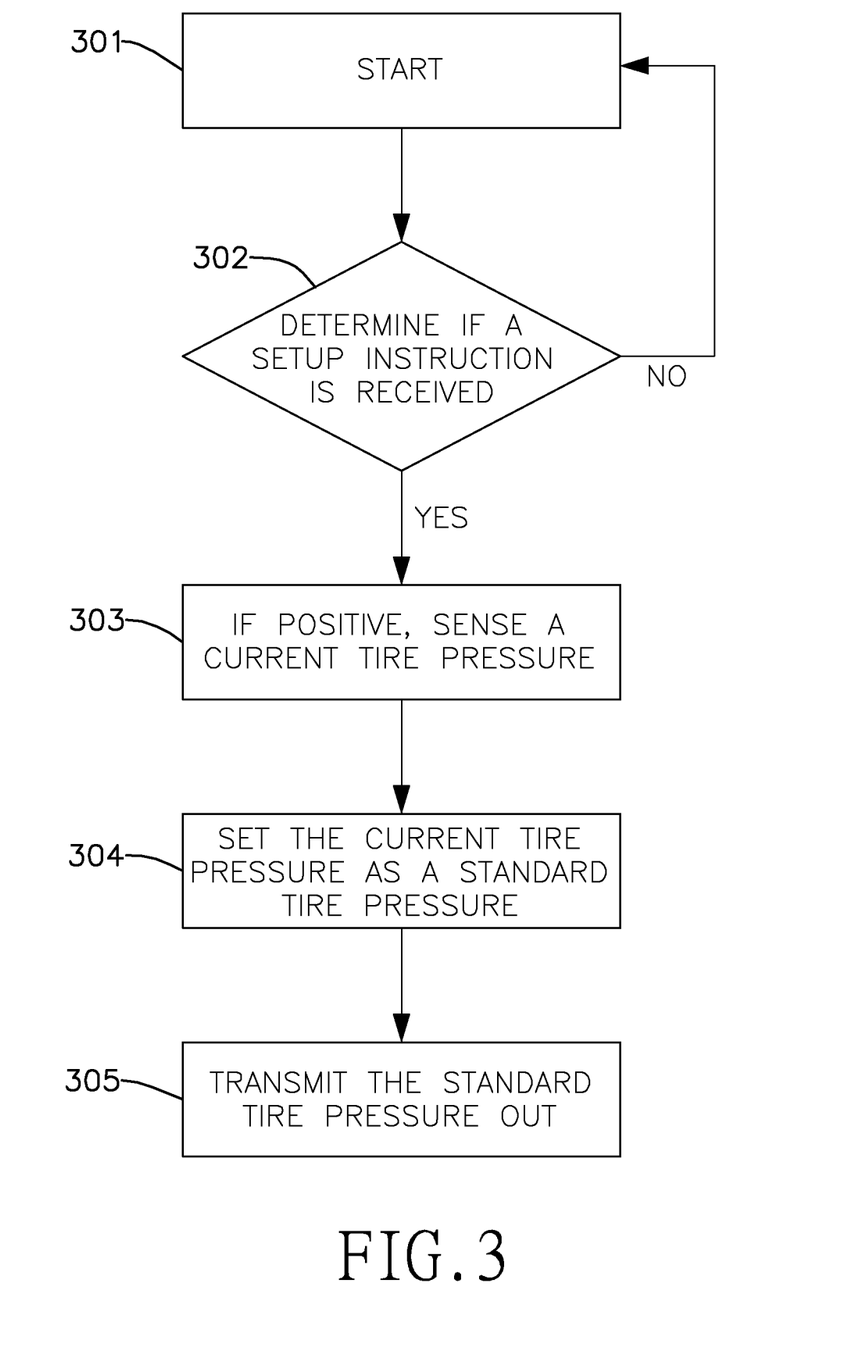
FIG. 3 is a flow chart of a second embodiment of a method for setting a standard tire pressure in accordance with the present invention.

In the foregoing method, the wireless tire pressure sensor 10 automatically sets the detected tire pressure as the standard tire pressure after the pre-defined time period ends. Besides the automatic set up means, the wireless tire pressure sensing device 10 can be activated by an external signal to passively set up a detected tire pressure as a standard tire pressure. With reference to FIG. 3, a second embodiment of a method for setting a standard tire pressure in accordance with the present invention has the following steps of:

starting 301;
determining if a setup instruction is received 302;
if positive, sensing a current tire pressure 303; and
setting the current tire pressure as a standard tire pressure 304.

The passive tire pressure set up method can be substantially implemented as follows.

The wireless tire pressure sensing device 10 preset with none of any standard tire pressure is mounted in a tire. The wireless tire pressure sensing device 10 is activated to enter a setup mode. In accordance with the actual demand of a vehicle, the tire pressure is adjusted to a standard value. Then, a setup instruction is transmitted externally to the wireless tire pressure sensing device 10. The micro-controller 11 senses a current tire pressure through the sensing chip 12 and automatically sets the current tire pressure as the standard tire pressure.

Furthermore, besides actively or passively setting the sensed tire pressure as the standard tire pressure, the wireless tire pressure sensor 10 can further transmit the standard tire pressure out 305 to an external device to serve as a critical value for the monitoring unit to compute and set alerts accordingly.

Figure 4A:
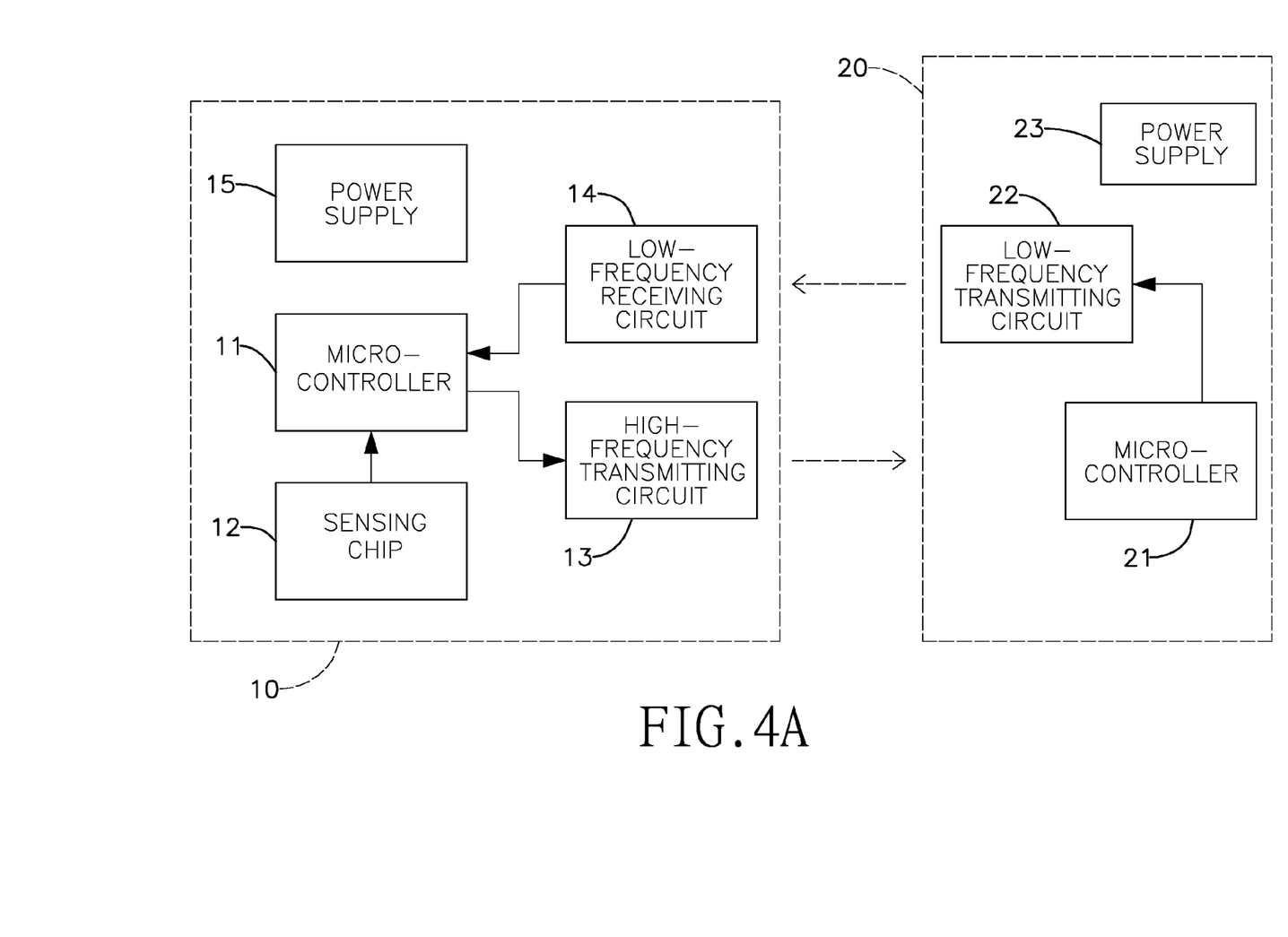
FIG. 4A is a functional block diagram of a first embodiment of a wireless tire pressure sensing activation device communicating with a second embodiment of a wireless tire pressure sensing device in accordance with the present invention.

With reference to FIG. 4A, a first embodiment of a wireless tire pressure sensing activation device communicating with a second embodiment of a wireless tire pressure sensing device in accordance with the present invention is shown. The wireless tire pressure sensing device has a micro-controller 11, a sensing chip 12, a high-frequency transmitting circuit 13, a low-frequency receiving circuit 14 and a power supply 15. The low-frequency receiving circuit 14 is connected to an input terminal of the micro-controller 11 and receives a setup instruction from the wireless tire pressure sensing activation device.

The wireless tire pressure sensing activation device has a micro-controller 21, a low-frequency transmitting circuit 22 and a power supply 23. The low-frequency transmitting circuit 22 is connected to an output terminal of the micro-controller 21, and transmits a setup instruction to the wireless tire pressure sensing device 10 under the control of users. The power supply supplies an operating power to the micro-controller 21 and the low-frequency transmitting circuit 22.

Figure 4B:
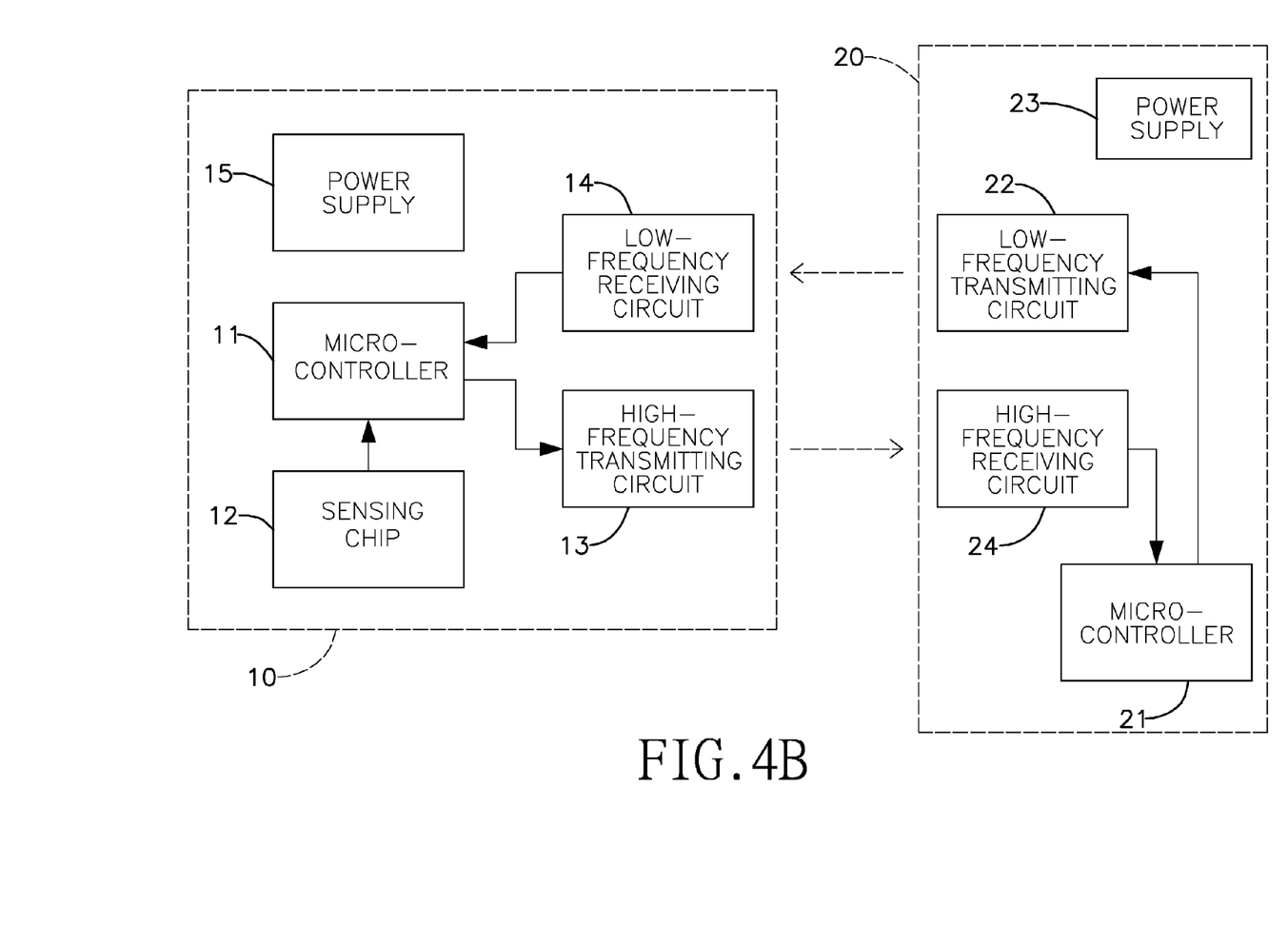
FIG. 4B is a functional block diagram of a second embodiment of a wireless tire pressure sensing activation device communicating with the wireless tire pressure sensing device in FIG. 4A.

With reference to FIG. 4B, a second embodiment of a wireless tire pressure sensing activation device communicating with the wireless tire pressure sensing device is shown. Besides transmitting the setup instruction to the wireless tire pressure sensing device 10, the wireless tire pressure sensing activation device further receives data of the standard tire pressure transmitted from the wireless tire pressure sensing device 10. In the present embodiment, the wireless tire pressure sensing activation device additionally has a high-frequency receiving circuit 24. The high-frequency receiving circuit 24 is connected to an input terminal of the micro-controller 21 and receives data transmitted from the wireless tire pressure sensing device 10.

The wireless tire pressure sensing activation device 20 can serve as a standalone device dedicated to transmit the setup instruction to and receive the standard tire pressure from the wireless tire pressure sensing device 10, and may be a handheld device, embedded in the monitoring unit of a WTPMS or mounted in the vicinity of a wheel of a vehicle.

As mentioned, the wireless tire pressure sensing activation device 20 can transmit the setup instruction to the wireless tire pressure sensing device 10 through the low-frequency transmitting circuit 22 so that the wireless tire pressure sensing device 10 senses and sets up the standard tire pressure in response to the setup instruction. Besides externally activated by the low-frequency signal, the wireless tire pressure sensing device 10 can be activated by other external means. The external means is a sensing element that is mounted inside the wireless tire pressure sensing device 10. The sensing element detects a signal of a setup instruction in collaboration with a control procedure of the micro-controller 11 after a driving element externally approaches and is continuously sensed by the sensing element for a period of time, such as 1 to 3 seconds. The sensing element then starts sensing and setting up a standard tire pressure. The sensing element may be a magnetic sensing element, and the driving element may be a magnetic activation device, such as a magnet.

As the wireless tire pressure sensing device is mounted and sealed in a tire before the shipment of the tire, the standard tire pressure of the wireless tire pressure sensing device should be adjusted through a contactless method.

Figure 5:
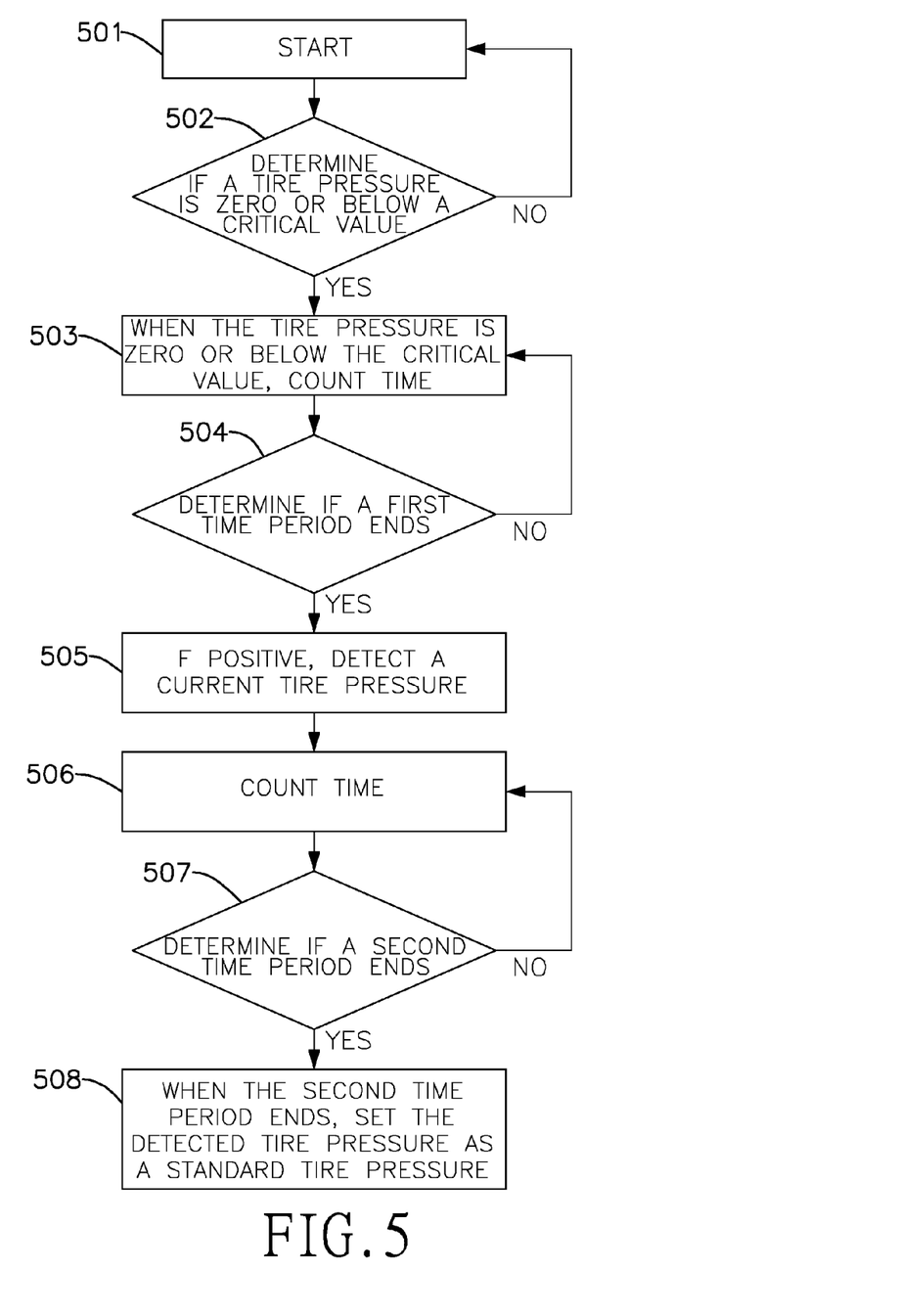
FIG. 5 is a flow chart of a first embodiment of a method for modifying a standard tire pressure in accordance with the present invention.

With reference to FIG. 5, a contactless method for modifying a standard tire pressure in accordance with the present invention has the following steps of:

starting 501;
determining if a tire pressure is zero or below a critical value 502;
when the tire pressure is zero or below the critical value, counting time 503;
determining if a first time period ends 504;
if positive, detecting a current tire pressure 505;
counting time 506;
determining if a second time period ends 507; and
when the second time period ends, setting the detected tire pressure as a standard tire pressure 508.

The above method can be substantially implemented as follows. After a tire is deflated and the wireless tire pressure sensing device in the tire stays at a pressure-free condition for over a preset first time period, for example 3 minutes, the tire is inflated to a standard tire pressure to be set up. The wireless tire pressure sensing device in the tire is maintained at the standard tire pressure for over a preset second time period, for example 5 minutes. After the second time period is over, the wireless tire pressure sensing device automatically sets the detected tire pressure as the standard tire pressure.

Figure 6:
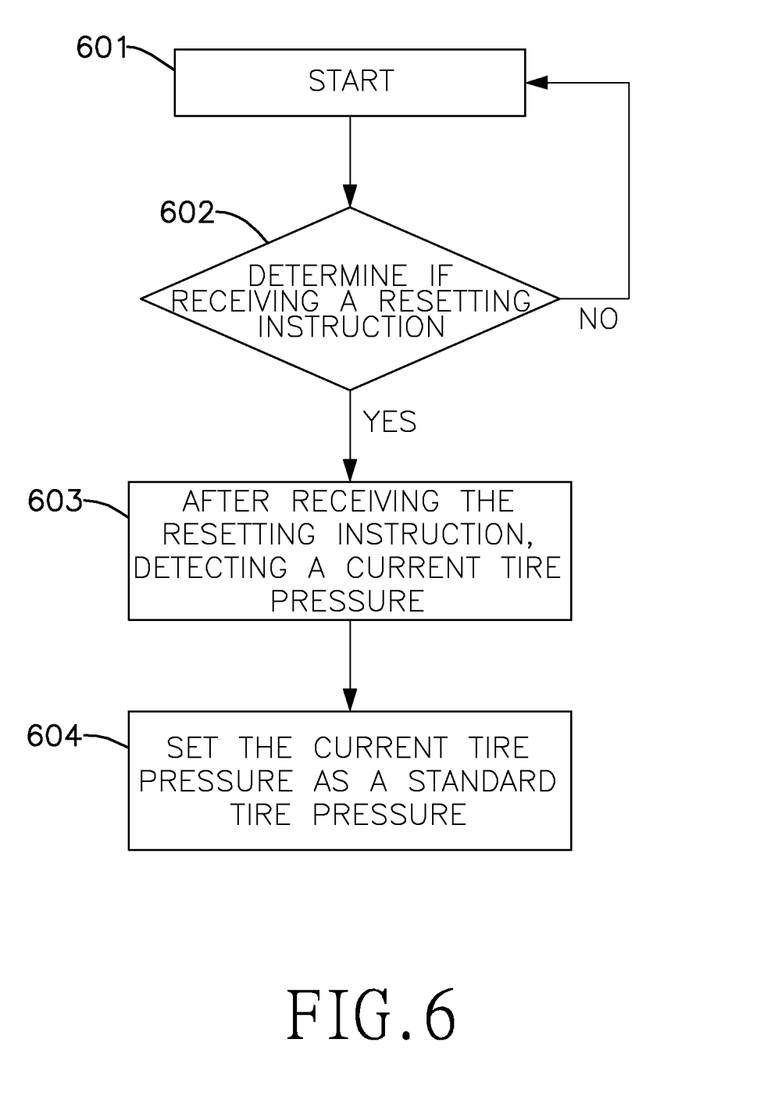
FIG. 6 is a flow chart of a second embodiment of a method for modifying a standard tire pressure in accordance with the present invention.

With reference to FIG. 6, a second embodiment of a contactless method for modifying a standard tire pressure in accordance with the present invention has the following steps of:
  entering a standard tire pressure modification mode 601;
  determining if receiving a resetting instruction 602;
  after receiving the resetting instruction, detecting a current tire pressure 603; and
  setting the current tire pressure as a standard tire pressure 604.

The above method can be substantially implemented as follows. A tire is inflated to a standard tire pressure to be set up. The wireless tire pressure sensing activation device outside the tire is employed to transmit the resetting instruction to the wireless tire pressure sensing device. After the wireless tire pressure sensing device receives the resetting instruction, the wireless tire pressure sensing device sets the detected current tire pressure as the standard tire pressure, or further transmits out data of the standard tire pressure to the monitoring unit for computation.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A method for setting a standard tire pressure of a wireless tire pressure sensing device, performed in a tire pressure setup mode and comprising steps of:
  counting time until a time period is completed;
  detecting a current tire pressure; and
  setting the current tire pressure as the standard tire pressure.

2. The method as claimed in claim 1, wherein the wireless tire pressure sensing device is adapted to be mounted in each tire of a vehicle, the tire pressure in each tire is adjusted to the standard tire pressure according to a requirement of the vehicle, the tire is maintained at the standard pressure for the time period, and after the time period is over, the wireless tire pressure sensing device detects the current tire pressure and automatically sets the current tire pressure as the standard tire pressure of the tire.

3. The method as claimed in claim 1, performed in a standard tire pressure modification mode and further comprising steps of:
  determining if a tire pressure is zero or below a critical value;
  when the tire pressure is zero or below the critical value, counting time;
  determining if a first time period is completed;
  when the first time period is completed; detecting a current tire pressure;
  counting time;
  determining if a second time period is completed; and
  when the second time period is completed, setting the detected tire pressure as a standard tire pressure.

4. The method as claimed in claim 2, performed in a standard tire pressure modification mode and further comprising steps of:
  determining if a tire pressure is zero or below a critical value;
  when the tire pressure is zero or below the critical value, counting time;
  determining if a first time period is completed;
  when the first time period is completed, detecting a current tire pressure;
  counting time;
  determining if a second time period is completed; and
  when the second time period is completed, setting the detected tire pressure as a standard tire pressure.

5. A method for setting a standard tire pressure of a wireless tire pressure sensing device, performed in a tire pressure setup mode and comprising steps of:
  determining if a setup instruction is received;
  if positive; sensing a current tire pressure; and
  setting the current tire pressure as a standard tire pressure.

6. The method as claimed in claim 5, wherein the wireless tire pressure sensing device is adapted to be mounted in each tire of a vehicle, the tire pressure of each tire is adjusted to the standard tire pressure according to a requirement of the vehicle, the setup instruction is externally transmitted to the wireless tire pressure sensing device, and the wireless tire pressure sensing device senses and set the current tire pressure as the standard tire pressure after receiving the setup instruction.

7. The method as claimed in claim 6, wherein the wireless tire pressure sensing device further transmits data having the standard tire pressure out.

8. The method as claimed in claim 7, performed in a tire pressure modification mode and further comprising steps of:
  determining if receiving a resetting instruction;
  after receiving the resetting instruction, detecting a current tire pressure; and
  setting the current tire pressure as the standard tire pressure.

9. A wireless tire pressure sensing activation device for generating the setup instruction as claimed in claim 8, the device comprising:
  a micro-controller;
  a low-frequency transmitting circuit connected to an output terminal of the micro-controller for transmitting a setup instruction to the wireless tire pressure sensing device;
  a high-frequency receiving circuit connected to an input terminal of the micro-controller for receiving data having the standard tire pressure from the wireless tire pressure sensing device; and
  a power supply supplying an operating power to the micro-controller, the low-frequency transmitting circuit and the high-frequency receiving circuit.

10. The wireless tire pressure sensing activation device as claimed in claim 9, wherein the wireless tire pressure sensing activation device is adapted to be mounted in a monitoring unit of a wireless tire pressure monitoring system.

11. A wireless tire pressure sensing activation device for generating the setup instruction as claimed in claim 7, the device comprising:
  a micro-controller;
  a low-frequency transmitting circuit connected to an output terminal of the micro-controller for transmitting a setup instruction to the wireless tire pressure sensing device;

a high-frequency receiving circuit connected to an input terminal of the micro-controller for receiving data having the standard tire pressure from the wireless tire pressure sensing device; and a power supply supplying an operating power to the micro-controller, the low-frequency transmitting circuit and the high-frequency receiving circuit.

12. The wireless tire pressure sensing activation device as claimed in claim 11, wherein the wireless tire pressure sensing activation device is adapted to be mounted in a monitoring unit of a wireless tire pressure monitoring system.

13. The method as claimed in claim 6, performed in a tire pressure modification mode and further comprising steps of:
determining if receiving a resetting instruction;
after receiving the resetting instruction, detecting a current tire pressure; and
setting the current tire pressure as the standard tire pressure.

14. A wireless tire pressure sensing activation device for generating the setup instruction as claimed in claim 13, the device comprising:
a micro-controller;
a low-frequency transmitting circuit connected to an output terminal of the micro-controller for transmitting a setup instruction to the wireless tire pressure sensing device;
a high-frequency receiving circuit connected to an input terminal of the micro-controller for receiving data having the standard tire pressure from the wireless tire pressure sensing device; and
a power supply supplying an operating power to the micro-controller, the low-frequency transmitting circuit and the high-frequency receiving circuit.

15. The wireless tire pressure sensing activation device as claimed in claim 14, wherein the wireless tire pressure sensing activation device is adapted to be mounted in a monitoring unit of a wireless tire pressure monitoring system.

16. A wireless tire pressure sensing activation device for generating the setup instruction as claimed in claim 6, the device comprising:
a micro-controller;
a low-frequency transmitting circuit connected to an output terminal of the micro-controller for transmitting a setup instruction to the wireless tire pressure sensing device;
a high-frequency receiving circuit connected to an input terminal of the micro-controller for receiving data having the standard tire pressure from the wireless tire pressure sensing device; and
a power supply supplying an operating power to the micro-controller, the low-frequency transmitting circuit and the high-frequency receiving circuit.

17. The wireless tire pressure sensing activation device as claimed in claim 16, wherein the wireless tire pressure sensing activation device is adapted to be mounted in a monitoring unit of a wireless tire pressure monitoring system.

18. The method as claimed in claim 5, performed in a tire pressure modification mode and further comprising steps of:
determining if receiving a resetting instruction;
after receiving the resetting instruction, detecting a current tire pressure; and
setting the current tire pressure as the standard tire pressure.

19. A wireless tire pressure sensing activation device for generating the setup instruction as claimed in claim 18, the device comprising:
a micro-controller;

a low-frequency transmitting circuit connected to an output terminal of the micro-controller for transmitting a setup instruction to the wireless tire pressure sensing device;
a high-frequency receiving circuit connected to an input terminal of the micro-controller for receiving data having the standard tire pressure from the wireless tire pressure sensing device; and
a power supply supplying an operating power to the micro-controller, the low-frequency transmitting circuit and the high-frequency receiving circuit.

20. The wireless tire pressure sensing activation device as claimed in claim 19, wherein the wireless tire pressure sensing activation device is adapted to be mounted in a monitoring unit of a wireless tire pressure monitoring system.

21. A wireless tire pressure sensing activation device for generating the setup instruction as claimed in claim 5, the device comprising:
a micro-controller;
a low-frequency transmitting circuit connected to an output terminal of the micro-controller for transmitting a setup instruction to the wireless tire pressure sensing device;
a high-frequency receiving circuit connected to an input terminal of the micro-controller for receiving data having the standard tire pressure from the wireless tire pressure sensing device; and
a power supply supplying an operating power to the micro-controller, the low-frequency transmitting circuit and the high-frequency receiving circuit.

22. The wireless tire pressure sensing activation device as claimed in claim 21, wherein the wireless tire pressure sensing activation device is adapted to be mounted in a monitoring unit of a wireless tire pressure monitoring system.

23. A wireless tire pressure sensing device, comprising:
a micro-controller;
at least one sensing chip respectively connected to at least one input terminal of the micro-controller, and detecting tire pressure and temperature inside a tire;
a high-frequency transmitting circuit connected to an output terminal of the micro-controller;
a sensing element respectively connected to an input terminal of the micro-controller for receiving a setup instruction; and
a power supply supplying an operating power to the micro-controller, the at least one sensing chip, the high-frequency transmitting circuit and the sensing element.

24. The wireless tire pressure sensing device as claimed in claim 23, wherein the sensing element is a magnetic sensor.

25. The wireless tire pressure sensing device as claimed in claim 24, further comprising a low-frequency receiving circuit connected to an input terminal of the micro-controller.

26. The wireless tire pressure sensing device as claimed in claim 23, wherein the sensing element is an acceleration sensor.

27. The wireless tire pressure sensing device as claimed in claim 26, further comprising a low-frequency receiving circuit connected to an input terminal of the micro-controller.

28. The wireless tire pressure sensing device as claimed in claim 23, further comprising a low-frequency receiving circuit connected to an input terminal of the micro-controller.

29. A wireless tire pressure sensing device, comprising:
a micro-controller;
at least one sensing chip respectively connected to at least one input terminal of the micro-controller, and detecting tire pressure and temperature inside a tire;
a high-frequency transmitting circuit connected to an output terminal of the micro-controller;

a low-frequency receiving circuit connected to an input terminal of the micro-controller; and a power supply supplying an operating power to the micro-controller, the at least one sensing chip, the high-frequency transmitting circuit and the low-frequency receiving circuit.

\* \* \* \* \*

UNITED STATES PATENT AND TRADEMARK OFFICE
CERTIFICATE OF CORRECTION

| | | |
|---|---|---|
| PATENT NO. | : 8,667,837 B2 | Page 1 of 1 |
| APPLICATION NO. | : 13/109173 | |
| DATED | : March 11, 2014 | |
| INVENTOR(S) | : Hung-Chih Yu | |

It is certified that error appears in the above-identified patent and that said Letters Patent is hereby corrected as shown below:

On the Title Page, item (73), assignee name, is listed as "Orange Electronics Co., Ltd."

The assignee name should read: --Orange Electronic Co., Ltd.--

Signed and Sealed this
Ninth Day of September, 2014

Michelle K. Lee
*Deputy Director of the United States Patent and Trademark Office*